United States Patent [19]

Akabane et al.

[11] Patent Number: 4,707,101
[45] Date of Patent: Nov. 17, 1987

[54] OPERATING MEMBERS FOR A CAMERA

[75] Inventors: Jun Akabane, Tokyo; Hitoshi Suyama, Kawasaki, both of Japan

[73] Assignee: Nippon Kogaku K. K., Tokyo, Japan

[21] Appl. No.: 938,609

[22] Filed: Dec. 5, 1986

[30] Foreign Application Priority Data

Dec. 16, 1985 [JP] Japan .......................... 60-193325[U]

[51] Int. Cl.⁴ ............................................ G03B 17/00
[52] U.S. Cl. ................................................. 354/289.1
[58] Field of Search ............. 354/195.1, 195.13, 289.1, 354/289.11, 289.12, 202, 400, 409; 180/315

[56] References Cited

U.S. PATENT DOCUMENTS 2,917,984  12/1959  Faulhaber ................... 354/289.1 X

FOREIGN PATENT DOCUMENTS 1159265  6/1959  Fed. Rep. of Germany ...... 354/273
112724   7/1982  Japan ............................... 354/289.1
520960   5/1940  United Kingdom ........... 354/288 A Primary Examiner—Donald A. Griffin
Attorney, Agent, or Firm—Shapiro and Shapiro

[57] ABSTRACT

Operating members for a camera typically comprising a first operating member for the purpose of switching over from automatic adjustment to manual adjustment and vice versa for the camera and a second operating member for turning on or off electric power source. Each of the operating members is designed in the form of a knob and a turning movement indication pattern is formed on the operating member. The operating members themselves may function as a turning movement indication pattern. The camera housing is integrally provided with raised portions on the upper surface thereof and the operating member is disposed in the area between the adjacent raised portions or disposed adjacent to the raised portion. When the operating members are set to their predetermined position, the turning movement indication patterns on the operating members are aligned with the stationary patterns on the raised portions on a common band-shaped area on the upper surface of the camera housing. At this moment a combination of the operating members and the raised portion looks like a single indication pattern when each of the operating members and the raised portions functions as an indication pattern. A combination of the operating members and the raised portions aligned with one after another in that way may have an arcuate pattern as seen from the above.

5 Claims, 7 Drawing Figures

OPERATING MEMBERS FOR A CAMERA

BACKGROUND OF THE INVENTION

1. Field of the Invention

The present invention relates to operating members for a camera and more particularly to arrangement of the operating members for the purpose of switching over from automatic adjustment to manual adjustment and vice versa for the camera.

2. Related Background Art

Many conventional small-sized cameras are provided with a plurality of operating members such as operating member for adjusting the degree of exposure, operating member for switching over from automatic operation to manual operation and vice versa to adjust the distance between the camera and an object to be photographed, and an operating member for turning on or off an electric power source switch or the like. Among the operating members as mentioned above there are known some operating members which require that they are shifted to the OFF position to turn off electric power source when the camera is not in use. A typical operating member of this type is an electric power source switch. In the case of a camera which is designed to switch over from automatic operation to manual operation and vice versa to achieve exposure adjustment and distance adjustment as required it is preferable that operating members are normally set to the automatic position where the camera carries out automatic adjustment.

Particularly, when the conventional camera is kept in the inoperative state for a long period of time or when an operator starts to photograph with the use of the camera which has been kept in the inoperative state in that way, there is a necessity for visually confirming whether or not predetermined indexes on operating members are correctly aligned with one another as required. However, confirming operation is troublesome for the operator.

SUMMARY OF THE INVENTION

Hence, the present invention has been made with the foregoing drawbacks inherent to the conventional camera in mind and its object resides in providing operating members for a camera which assures that whether or not the operating members assume their predetermined state can be easily confirmed at a glance.

According to the present invention the camera includes a plurality of operating members turnably disposed on a camera housing, an elongated band-shaped turning movement indication pattern formed on each of the operating members and stationary indication patterns disposed between the adjacent operating members on the camera housing and having the substantially same width as that of the turning movement indication patterns. When the operating members are set to their predetermined position, the turning movement indication patterns on the operating members are aligned with the stationary indication patterns on a single band-shaped area on the upper surface of the camera housing. As long as the operating members are arranged in the aligned state in the band-shaped pattern, an operator can visually confirm that the operating members assume their predetermined state. Accordingly, it is very easy to keep the operating members at their predetermined state.

Other objects, features and advantages of the invention will become readily apparent from reading of the following description which has been prepared in conjunction with the accompanying drawings.

DESCRIPTION OF THE PREFERRED EMBODIMENTS

Now, the present invention will be described in a greater detail hereunder with reference to the accompanying drawings which illustrate preferred embodiments thereof.

The three embodiments to be described later exemplify an operating member set position indicating device employable for an automatic focus adjusting camera which is so constructed that photographing is normally achieved while a photographing lens (hereinafter referred to simply as lens) is automatically brought in the correctly focused state by actuating an automatic focus adjusting unit and when automatic focus adjusting operation becomes undesirable, focusing is manually effected as required.

Figure 1:
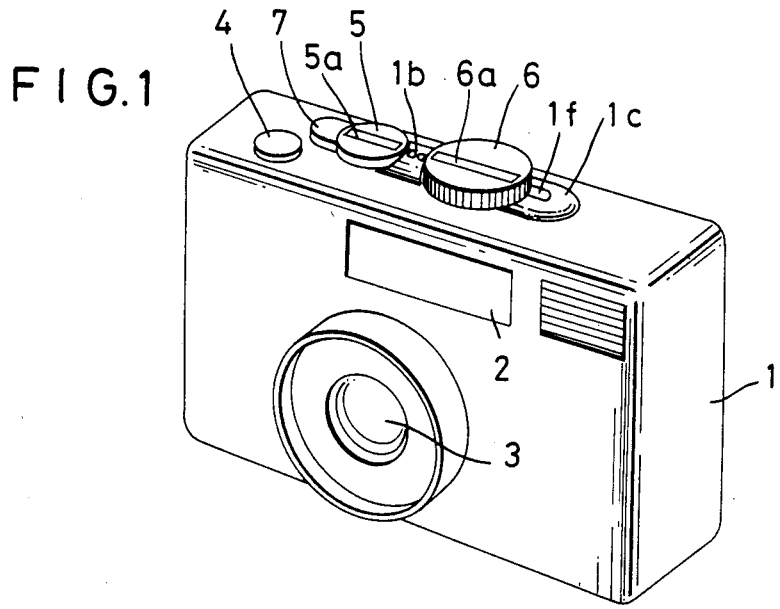
FIG. 1 is a perspective view of a camera including operating members in accordance with the first embodiment of the invention.
Figure 2:
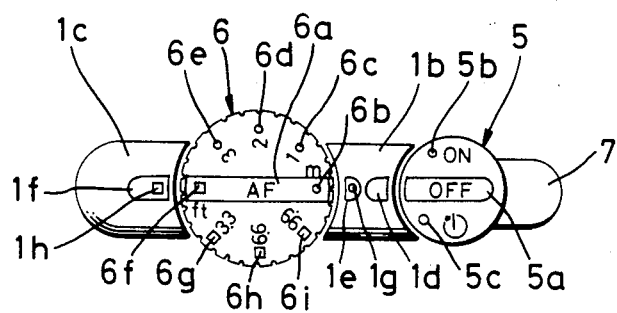
FIG. 2 is a plan view of the camera in FIG. 1, particularly illustrating that the operating members are set to the predetermined position.
Figure 3:
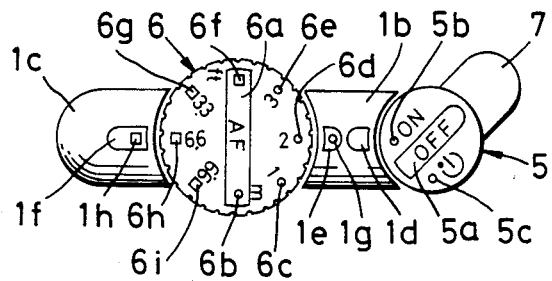
FIG. 3 is a plan view of the camera similar to FIG. 2, particularly illustrating that the set position of each of the operating members is shifted to another one.

First, description will be made below as to the first embodiment with reference to FIGS. 1 to 3. A camera body 1 includes a finder and a window 2 in which a so-called distance measuring unit for measuring a distance from the camera to an object to be photographed is incorporated. A lens 3 is adapted to move forwards in response to depressing of a release button 4 and an extent of movement of the lens 3 is determined by an output from the distance measuring unit whereby photographing is achieved while the correctly focussed state is assumed automatically. It should be noted that the automatic focus adjusting unit is constituted by a combination of the above-mentioned distance measuring unit and means for determining an extent of forward movement of the lens 3 in accordance with an output from the distance measuring unit but their structure is well known for any expert in the art and therefore repeated description will not be required. The camera body 1 is provided with two operating members on the upper surface thereof, one of them being a knob 5 for the purpose of electricity supply and the other one being a dial 6 for the purpose of changing over the state of focusing. As will be apparent from the drawings, both the knob 5 and the dial 6 are turnable. The knob 5 is turned by actuating a lever 7 made integral therewith so that electricity is supplied to electric circuits for the automatic focus adjusting unit, automatic exposure control unit and others. The dial 6 is turned by operation of an operator's fingers which are placed on the circumferential surface thereof so that the automatic focus adjusting unit is kept in the operative state or in the inoperative state. When the automatic focus adjusting unit assumes the inoperative state, the lens 3 can be displaced forwards to the position corresponding to the extent of turning movement of the dial 6. Thus, the correctly focused state can be obtained manually. A mechanism for displacing the lens 3 with the aid of the automatic focus adjusting unit or determining the position of the lens 3 by manual operation after completion of changing-over from automatic operation to manual operation is well known for any expert in the art and therefore its repeated description will not be required.

Next, the knob 5, the dial 6 and other components located in the vicinity of them will be described below in more details. In this embodiment the camera body 1 is formed with two raised portions 1b and 1c which are raised up above the upper surface of the camera body, as shown in FIG. 1, the raised portion 1b being located in the area between the knob 5 and the dial 6 and the raised portion 1c being located outside the dial 6. As shown in FIG. 2, the raised portions 1b and 1c, the knob 5 and the dial 6 are formed with linear wide patterns 1d, 1e, 1f, 5a and 6a. All the patterns as mentioned above are painted or coated with the same color which is different from the color of the upper surface 1a of the camera body 1, the raised portions 1b and 1c, the knob 5, the dial 6 and the lever 7. As will be apparent from FIG. 2, when the pattern 5a on the knob 5 is aligned with the pattern 1d on the raised portion 1b, supply of electricity to all the electric circuits in the camera including the automatic focus adjusting unit and the automatic exposure controlling unit is interrupted. Further, as shown in FIG. 3, when an index 5b on the knob 5 is aligned with the pattern 1d on the raised portion 1b by turning the knob 5, supply of electricity to the electric circuits in the automatic focus adjusting unit, the automatic exposure controlling unit and others is resumed. Further, when an index 5c on the knob 5 is aligned with the pattern 1d, supply of electricity to a self-timer circuit in addition to the automatic focus adjusting unit and the automatic exposure controlling unit is resumed. This means that photographing with the use of a self-timer is selected when the index 5c is aligned with the pattern 1d. Further, as shown in FIG. 2, when an index 6b on the pattern 6a of the dial 6 is aligned with an index 1g on the pattern 1e of the raised portion 1b, the automatic focus adjusting unit is ready to operate. Since an electric power switch is turned off when the pattern 5a on the knob 5 is aligned with the pattern 1d on the raised portion 1b at this moment, the automatic focus adjusting unit, the automatic exposure controlling unit and others do not operate any longer irrespective of how the release button 4 is depressed and moreover any photographing is not achieved. When an index 6c or 6d on the dial 6 is aligned with the index 1g on the raised portion 1b, the automatic focus adjusting unit is kept in the inoperative state. Accordingly, the automatic focus adjusting unit does not operate at this moment even when the index 5b or 5c on the knob 5 is aligned with the pattern 1d on the raised portion 1b. This means that the automatic focus adjusting unit becomes operative in association with depressing of the release button 4 only when the index 5b or 5c on the knob 5 is aligned with the pattern 1d on the raised portion 1b and moreover the index 6b on the dial 6 is alinged with the index 1g on the raised portion 1b. It should be noted that when the index 6c on the dial 6 is aligned with the index 1g on the raised portion 1b, this means that the lens 3 assumes the correctly focused position relative to an object which is located away therefrom by a distance of 1 m as represented by letters impressed on the dial 6.

Specifically, arrangement is so made that the lens 3 is displaced forwards to reach the correctly focused position where an object is located away from the lens 3 by a distance of 1 m at the same time when the dial 6 is turned or it is displaced forwards to assumes the correctly focused position only when the release button 4 is depressed. When the index 6d or 6e on the dial 6 is aligned with the index 1g on the raised portion 1b, the lens 3 assumes the correctly focused position relative to an object which is located away therefrom by a distance of 2 m or 3 m as represented by letters impressed on the dial 6 in the same manner as mentioned above. FIG. 3 shows an operative state where the index 6d on the dial 6 is aligned with the index 1g on the raised portion 1b. In practice, distance determination is made by manual operation in the above-described manner.

Further, in the illustrated embodiment a pattern 1f on the raised portion 1c is located at the position opposite to the pattern 1e on the raised portion 1b with the dial 6 being interposed therebetween and an index 1h is provided on the pattern 1f. Thus, when the index 6b, 6c, 6d or 6e is aligned with the index 1g on the raised portion 1b, the index 6f, 6g, 6h or 6i is brought in the aligned state relative to the index 1h on the raised portion 1c. The indexes 6f, 6g, 6h and 6i on the dial 6 indicate photographing positions comprising automatically focused positions 3.3 ft, 6.6 ft and 9.9 ft as represented by letters impressed on the dial 6. Accordingly, in this embodiment manual distance determination can be made in meter unit by locating one of the indexes 6b to 6e in alignment with the index 1g and moreover manual distance determination can be made in foot unit by locating the indexes 6f to 6i with the index 1h.

Incidentally, it is a common practice that an operator selects automatic focus adjustment when he uses a camera by which automatic focus adjustment can be achieved and while no photographing is practiced, electric power source for the camera is turned off. As shown in FIGS. 1 and 2, the camera of the invention is so constructed that automatic focus adjustment is employed and all the patterns 1f, 6a, 1e, 1d and 5a are arranged in correct alignment with one after another on a single band-shaped area when the electric power source is turned off. Thus, an operator can visually confirm without any particular difficulty that all the patterns assume their predetermined orientation. Accordingly, when an operator uses the camera of the invention, it is easily possible to inhibit an occurrence of such malfunctions that he forgets to turn off electric power source when it is expected that the camera is kept in the inoperative state for a long period of time and he forgets to select automatic focus adjustment when he starts to effect photographing with the use of his camera. Further, in this embodiment a counter line of each of the raised portions 1b and 1c as well as a contour line of the lever 7 extend in parallel with the direction of extension of the patterns 1f, 6a, 1e, 1d and 5a as shown in FIG. 2. This leads to a result that an operator can more easily confirm that each of the operating members assumes their predetermined position.

Figure 4:
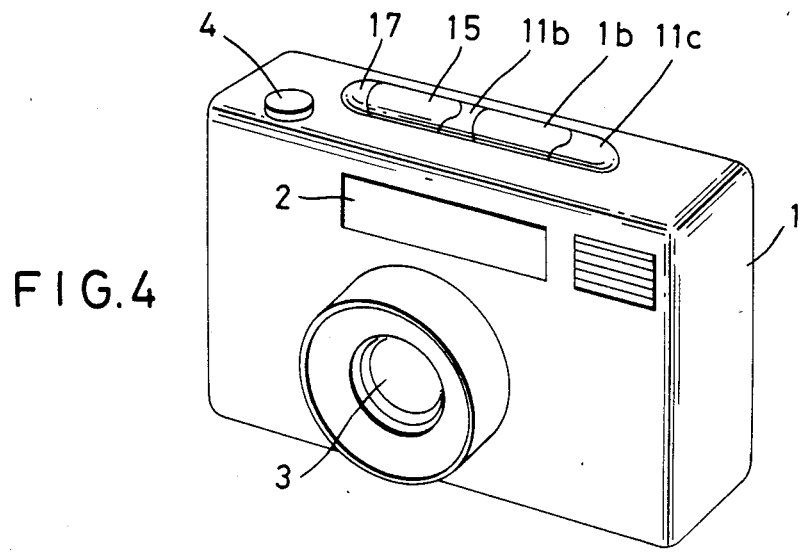
FIG. 4 is a perspective view of a camera including operating members in accordance with the second embodiment of the invention.
Figure 5:
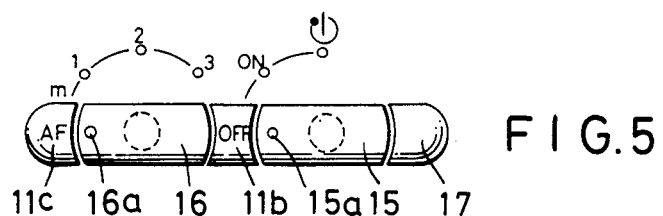
FIG. 5 is a plan view of the camera in FIG. 4, particularly illustrating that the operating members are set to the predetermined position.
Figure 6:
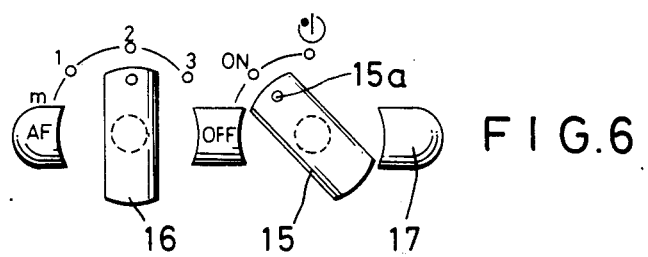
FIG. 6 is a plan view of the camera similar to FIG. 5, particularly illustrating that the set position of each of the operating members is shifted to another position where photographing is ready to be effected.

Next, description will be made below as to the second embodiment of the invention with reference to FIGS. 4 to 6. In the first embodiment the camera is so constructed that it is provided with two operating members 5 and 6 and a plurality of linear patterns 1f, 6a, 1e, 1d and 5a on the upper surface of the camera body 1, the linear patterns 1f, 6a, 1e, 1d and 5d being painted or coated with the same color, and all the patterns are arranged in correct alignment with one after another on a band-shaped area when they assume the position as shown in FIG. 2. On the other hand, in the second embodiment to be described later the camera is constructed in the different manner from that of the first embodiment such that a contour line of each of the raised portions disposed on the upper surface of the camera body 1 as well as a contour line of each of the operating members build a single linear pattern as shown in FIG. 4. As will be best seen in FIG. 5, the contour lines of the raised portions and the contour lines of the operating members are arranged in correct alignment with one after another on a single band-shaped area when the operating members assume the illustrated position.

As shown in FIG. 4, the camera body 1 is integrally formed with raised portions 17, 11b and 11c on the upper surface thereof. A knob 15 for the purpose of supply of electricity is disposed in the area between both the raised portions 17 and 11b, while a knob 16 for the purpose of changing over focusing is disposed in the area between both the raised portions 11b and 11c. Both the knobs 15 and 16 can be turned as required. While an index 15a on the knob 15 is aligned with letters OFF impressed on the raised portion 11b as shown in FIG. 5, supply of electricity to all the electric circuits in the camera is interrupted. Further, when the index 15a is aligned with the ON position on the upper surface of the camera body by turning the knob 15 in the clockwise direction as shown in FIG. 6, electricity is supplied to the automatic focus adjusting unit, the automatic exposure controlling unit and others and moreover when the index 15a is aligned with the next index on the upper surface of the camera body by turning the knob 15 further in the clockwise direction as seen in the drawing, electricity is supplied to the self-timer circuit in addition to the automatic focus adjusting unit, the automatic exposure controlling unit and others. As shown in FIG. 5, while an index 16a on the knob 16 is aligned with letters AF impressed on the raised portion 11c, the automatic focus adjusting unit is ready to operate. As will be apparent from the drawings, as the knob 16 is turned in the clockwise direction, the lens 3 assumes one of the correctly focused positions relative to an object which is located away therefrom by a distance of 1 m, 2 m or 3 m. Particularly, FIG. 6 illustrates the operative state where the correctly focused position relative to an object which is located away from the camera by a distance of 2 m is reached. In this embodiment supply of electricity to the automatic focus adjusting unit, the automatic exposure controlling unit and others, operation of the automatic focus adjusting unit and manual determination of distance are achieved in the same manner as in the first embodiment. It should be noted that in the second embodiment the upper surface 1a of the camera body, the raised portions and the knobs are painted or coated with the same color exclusive the indexes and letters.

In the second embodiment a contour line of each of the raised portions 17, 11b and 11c and a contour line of each of the knobs 15 and 16 build a linear pattern respectively. As shown in FIGS. 4 and 5, when automatic focus adjustment is selectively employed for the camera and electric power source is turned off, the raised portions 17, 11b and 11c and the knobs 15 and 16 are arranged in alignment with one after another on a single common band-shaped area. As will be best seen in FIG. 4, a combination of the raised portions 17, 11b and 11c and the knobs 15 and 16 looks like a single raised portion. Accordingly, just like in the first embodiment an operator can very easily confirm that the operating members assumes their predetermined position and moreover can inhibit an occurrence of such malfunctions that he forgets to turn off electric supply source and he forgets to select automatic focus adjustment.

Figure 7:
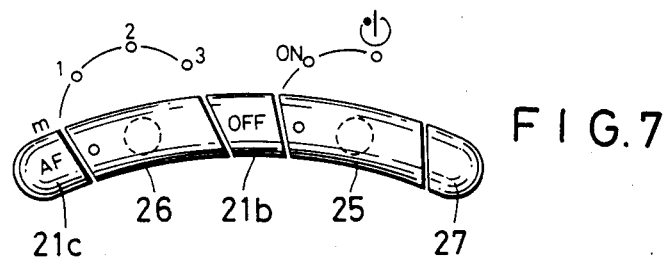
FIG. 7 is a plan view of operating members for a camera in accordance with the third embodiment of the invention, particularly illustrating that they are arranged on a band-shaped arcuate area on the upper surface of the camera housing.

Next, FIG. 7 illustrates the third embodiment of the present invention which is modified from the second embodiment. In the third embodiment patterns 21c, 26, 21b, 25 and 27 (which correspond to the raised portion 11c, the knob 16, the raised portion 11b, the knob 15 and the raised portion 17 in FIG. 5) are produced in the curved configuration of which radius of curvature is determined same for them, as is apparent from the drawing. When the operating members 25 and 26 assume the illustrated position, all the patterns build a continuously elongated arcuate configuration having a certain radius of curvature. This embodiment is quitely same to the second embodiment in other respects rather than those as mentioned above. Alternatively, another continuously elongated arcuate configuration may be built by a combination of patterns 21c, 26, 21b, 25 and 27 each of which has a different radius of curvature.

The above three embodiments of the invention have been described with respect to the operating members 6, 16 and 26 for the purpose of switching over focusing and the operating members 5, 15 and 25 for the purpose of supplying electricity. However, the present invention should not be limited only to them. Alternatively, the present invention may be applied to an operating member for the purpose of supplying electricity to a strobo which is incorporated in the camera, an operating member for the purpose of unwinding and an operating member for the purpose of photographically inputting a variety of data onto a film. In this case patterns on the operating members as mentioned above are arranged in alignment with one after another on a single linear band-shaped area or an arcuate band-shaped area, when electric power source for the strobo is turned off, when the unwound state is released or when data are photographically inputted at every time when photographing is effected onto a single frame on the film.

Incidentally, each of the above embodiments of the invention has been described as to operating members on a camera of the type including an automatic focusing unit, one of them being an operating member for switching over from automatic operation to manual operation and vice versa for the purpose of adjusting a distance between the camera and a object to be photographed and the other one being an operating member for turning on or off an electric power source switch but the present invention should not be limited only to this. Alternatively, the operating member for switching over from automatic operation to manual operation and vice versa for the purpose of adjusting a distance therebetween may be replaced with an operating member for switching over modes such as iris diaphragm preference mode, shutter preference mode, program mode or the like.

We claim:

1. A camera comprising:
    a camera housing;
    a plurality of operating members turnably disposed on said camera housing;
    a band-shaped turning movement indication pattern formed on each of said operating members to indicate turning movement of the latter;
    stationary indication patterns disposed between the adjacent operating members on the camera housing and having the substantially same width as that of said turning movement indication patterns; and
    the turning movement indication patterns on the operating members being aligned with said stationary indication patterns on a common band-shaped area on the camera housing when each of the operating members is set to a predetermined position.

2. A camera as claimed in claim 1, wherein each of the operating members comprises an operating knob of which upper surface assumes a circular shape and the turning movement indication pattern is formed on the upper surface of said operating knob in such a manner as to extend through the center of the circular upper surface.

3. A camera as claimed in claim 1, wherein each of the operating members comprises an elongated operating knob of which cross section assumes a semicircular shape, the arcuate line of said semicircular shape being raised up above the upper surface of the camera housing, so that the shape of said operating knob as seen from the above exhibits a turning movement indication pattern, and wherein each of the stationary indication patterns comprises a raised portion which is raised up above the upper surface of the camera housing, the cross section of said raised portion being same to that of the operating knob.

4. A camera as claimed in claim 1, wherein the operating members comprise a first operating knob for switching over from automatic adjustment to manual adjustment and vice versa for the camera and a second operating knob for turning on or off electric power source and the turning movement indication pattern on said first operating knob and the turning movement pattern on said second operating knob are aligned with the stationary indication patterns on the upper surface of the camera housing on a common band-shaped area when the turning movement indication pattern on the first operating knob is set to the automatic adjustment position and the turning movement pattern on the second operating knob is set to the position where electric power source is turned off.

5. A camera comprising:
    a camera housing;
    a plurality of operating members disposed in one direction within an area as defined by the upper surface of said camera housing, each of said operating members having a band-shaped pattern and being displaceable within the area as defined by the upper surface of the camera housing;
    a plurality of stationary patterns disposed in the one direction on the upper surface of the camera housing at the position located adjacent to each of said operating members, each of said stationary patterns having the substantially same width as that of said band-shaped pattern on each of the operating members; and
    the band-shaped patterns on the operating members and the stationary patterns being arranged in alignment with one another when the operating members are displaced to their predetermined position.

* * * * *